United States Patent
Maliszewski et al.

(10) Patent No.: US 11,270,349 B2
(45) Date of Patent: Mar. 8, 2022

(54) PORTABLE BILLBOARD

(71) Applicant: Productive Application Solutions, Inc., Sheridan, WY (US)

(72) Inventors: Gerald Maliszewski, San Diego, CA (US); Peter Ta, Tucson, AZ (US)

(73) Assignee: Productive Application Solutions, Inc., Sheridan, WY (US)

( * ) Notice: Subject to any disclaimer, the term of this patent is extended or adjusted under 35 U.S.C. 154(b) by 0 days.

(21) Appl. No.: 17/230,008

(22) Filed: Apr. 14, 2021

(65) Prior Publication Data
US 2021/0248647 A1 Aug. 12, 2021

Related U.S. Application Data

(63) Continuation-in-part of application No. 17/210,419, filed on Mar. 15, 2021, which is a
(Continued)

(51) Int. Cl.
*G06Q 30/02* (2012.01)
*H04N 9/31* (2006.01)
(Continued)

(52) U.S. Cl.
CPC ..... *G06Q 30/0272* (2013.01); *G06Q 30/0254* (2013.01); *G06Q 30/0264* (2013.01);
(Continued)

(58) Field of Classification Search
CPC .......... G06Q 30/0272; G06Q 30/0264; G06Q 30/0254; G06Q 30/0267; G06Q 30/0273;
(Continued)

(56) References Cited

U.S. PATENT DOCUMENTS

| 4,764,998 A | 8/1988 | Norris et al. |
| 5,086,988 A | 2/1992 | LaPoint et al. |

(Continued)

FOREIGN PATENT DOCUMENTS

| FR | 2578996 | 9/1986 |
| GB | 2402254 | 11/2002 |

(Continued)

OTHER PUBLICATIONS https://www.gold-agents.com/product.aspx?id=25966664 (Year: 2017).*
(Continued)

*Primary Examiner* — Michael W Schmucker
*Assistant Examiner* — Christopher C Busch
(74) *Attorney, Agent, or Firm* — Law Office of Gerald Maliszewski; Gerald Maliszewski

(57) ABSTRACT

A portable billboard is presented including a portable media projection subsystem to selectively project media and to supply an enablement signal in response to the media being projected. A location device supplies a geographic location of the media projection subsystem. A verifier receives the enablement signal and the geographic location, and supplies verification information responsive to the media being projected from a stationary location for a predetermined minimum duration of time. A communications subsystem receives verification information and either stores the information for subsequent downloads, or transmits the information to a central controlling server. A targeting subsystem permits an entity to select a target stationary location from a plurality of value weighted target stationary locations. The targeting application typically provides a reward in response to a value of the selected target stationary location.

16 Claims, 9 Drawing Sheets

Related U.S. Application Data continuation-in-part of application No. 17/179,574, filed on Feb. 19, 2021, which is a continuation-in-part of application No. 17/168,313, filed on Feb. 5, 2021, which is a continuation-in-part of application No. 17/133,722, filed on Dec. 24, 2020, now Pat. No. 11,055,743, which is a continuation-in-part of application No. 17/097,256, filed on Nov. 13, 2020, which is a continuation-in-part of application No. 17/071,043, filed on Oct. 15, 2020, now Pat. No. 11,037,199, which is a continuation-in-part of application No. 17/023,546, filed on Sep. 17, 2020, now Pat. No. 10,991,007, which is a continuation-in-part of application No. 17/007,575, filed on Aug. 31, 2020, which is a continuation of application No. 16/869,696, filed on May 8, 2020, now Pat. No. 10,803,488, which is a continuation of application No. 16/601,362, filed on Oct. 14, 2019, now Pat. No. 10,796,340.

(60) Provisional application No. 62/779,972, filed on Dec. 14, 2018.

(51) Int. Cl.

| | | |
|---|---|---|
| *H04W 88/10* | (2009.01) | |
| *G09F 9/30* | (2006.01) | |
| *G09F 27/00* | (2006.01) | |
| *G06V 40/16* | (2022.01) | |
| *G09F 21/08* | (2006.01) | |
| *G06N 20/00* | (2019.01) | |
| *G09F 9/33* | (2006.01) | |
| *G09F 9/35* | (2006.01) | |
| *G09F 19/18* | (2006.01) | |

(52) U.S. Cl.
CPC ....... *G06Q 30/0267* (2013.01); *G06V 40/166* (2022.01); *G09F 9/30* (2013.01); *G09F 27/00* (2013.01); *H04N 9/3147* (2013.01); *H04N 9/3173* (2013.01); *H04W 88/10* (2013.01); *G06N 20/00* (2019.01); *G06Q 30/0242* (2013.01); *G06Q 30/0273* (2013.01); *G09F 9/33* (2013.01); *G09F 9/35* (2013.01); *G09F 19/18* (2013.01); *G09F 21/08* (2013.01); *G09F 2027/001* (2013.01)

(58) Field of Classification Search
CPC ............. G06Q 30/0242; H04N 9/3173; H04N 9/3147; G06K 9/00255; G09F 27/00; G09F 9/30; G09F 19/18; G09F 2027/001; G09F 9/33; G09F 21/08; G09F 9/35; H04W 88/10; G06N 20/00
See application file for complete search history.

(56) References Cited

U.S. PATENT DOCUMENTS

| | | |
|---|---|---|
| 5,855,406 A | 1/1999 | Vargo |
| 6,017,078 A | 1/2000 | Stagner |
| 7,463,898 B2 | 12/2008 | Bayne |
| 8,010,134 B2 | 8/2011 | Barnes et al. |
| 8,368,562 B2 | 2/2013 | Horastemeyer |
| 8,712,630 B2 | 4/2014 | Walwer |
| 2002/0009978 A1 | 1/2002 | Dukach et al. |
| 2006/0129451 A1 | 6/2006 | Kohanim |
| 2007/0282682 A1* | 12/2007 | Dietz ................. G06Q 30/0242 705/14.41 |
| 2008/0227467 A1 | 9/2008 | Barnes |
| 2013/0304565 A1 | 11/2013 | Saccoman |
| 2013/0307706 A1 | 11/2013 | Kriezman |
| 2014/0214319 A1 | 7/2014 | Vucetic et al. |
| 2014/0274106 A1 | 9/2014 | Kim et al. |
| 2016/0267539 A1 | 9/2016 | Saah |
| 2016/0292744 A1* | 10/2016 | Strimaitis .......... G06Q 30/0269 |
| 2017/0132960 A1* | 5/2017 | Kis-Benedek Pinero ................... G06F 1/1637 |
| 2018/0144622 A1 | 5/2018 | Toyota |
| 2018/0186309 A1 | 7/2018 | Batten et al. |
| 2019/0149857 A1* | 5/2019 | Lo .................... H04N 21/43074 709/219 |
| 2021/0172733 A1* | 6/2021 | Winkelbach ....... G01B 11/2513 |

FOREIGN PATENT DOCUMENTS

| | | |
|---|---|---|
| JP | 2010/026474 | 2/2010 |
| JP | 2018072077 | 5/2018 |
| JP | 2018/205399 | 12/2018 |
| WO | WO 2008/135617 | 11/2008 |

OTHER PUBLICATIONS

Liu et al., iParking: An Intelligent Indoor Location-Based Smartphone Parking Service, Oct. 31, 2012, www.ncbi.nlm.nih.gov/pmc/articles/PMC3522932.

Morris et al., A Comprehensive System for Assessing Truck Parking Availability Final Report, Aug. 26, 2020, www.dot.state.mn.us/ofrw/PDF/assessing-truck-parking.pdf.

Mateusz Kulesza, E-Park: Automated-Ticketing Parking Meter Service, Apr. 2, 2015, https://dash.harvard.edu/bitstream/handle/1/17417570/Kulesza-Seniorthesis.

Florian Alt, A design Space fro pervasive Advertising on Public Displays, Jul. 12, 2012, https://pdfs.semanticscholar.org/4bel/aba88eb1d14e81dod610658bccbbi287b770.pdf.

Ben Coxworth, Truck-mounted billboards mprph with miles, Sep. 12, 2016, https://newatlas.com/roadads-eink-truck-billboards/453380.

Teachnoframe, LED Bus Screens, Nov. 18, 2011, https://technoframe.com/led-bus-screens.

Asku, Hidayet, "Advertising in the IoT Erra: Vision and Challenges", IEEE Communications, Jan. 31, 2018.

Parker, Phillip, "The 2018-2023 World Outlook for Outdoor Advertising", 2017 ICON Group International.

Morris et al.. A Comprehensive System for Assessing Truck Parking Availability, U of Minn, Jan. 2017.

Liu et al., An Intelligent Indoor Location-based Smartphone parking Service, MPDI, Oct. 2012.

Kulesza, Mateusz, E-Parking: Automated-Ticketing Parking Meter System, Harvard Library, Apr. 2015.

\* cited by examiner

PORTABLE BILLBOARD

RELATED APPLICATIONS

Any and all applications, if any, for which a foreign or domestic priority claim is identified in the Application Data Sheet of the present application are hereby incorporated by reference under 37 CFR 1.57.

BACKGROUND OF THE INVENTION

1. Field of the Invention

This invention generally relates to portable media platforms and, more particularly, to systems and methods for tracking the presentation of media presented on portable billboards.

2. Description of the Related Art

Market research shows that outdoor billboard marketing space has increasingly become harder to find and, hence, more valuable. At the same time, automotive vehicles are one of the most costly expenses incurred by the average consumer. Ironically, most automobiles sit idle for a large portion of the day. U.S. Pat. No. 10,796,340, entitled SYSTEM AND METHOD FOR TARGETING THE DISTRIBUTION OF MEDIA FROM A MOBILE PLATFORM, invented by Peter Ta et al., and filed on Oct. 14, 2019, addresses to problem of finding more outdoor advertising space by providing an automotive targeted parking system that adds to an automobile the additional feature of a media display subsystem, and which may also include a Wireless Local Area Network (WLAN) IEEE 802.11 (WiFi) access point (hotspot).

While the above-described system addresses the provision of additional outdoor advertising through the "gig economy" use of automobiles, the act of parking remains a potential issue. Parking in many desirable advertising locations in metropolitan areas is often limited to one or two hours only. Further, the necessity of frequently changing parking spots can become a burden and may make the use of their automobile as a mobile media center impractical for some owners.

Parent application Ser. No. 17/023,546, entitled AERIAL BILLBOARD, invented by Peter Ta et al, and filed on Sep. 17, 2020, provides for the use of aircraft, such as unmanned aerial vehicles (UAVs), as another type of media platform. However, battery operated devices have time limitations due to the need for recharging, and potential air space legal restrictions may exist in some regions.

It would be advantageous if additional real estate could be found for communications and for the presentation of media, beyond requirement of using just mobile platforms.

SUMMARY OF THE INVENTION

A system and method are disclosed herein for a portable billboard, for use in providing a media subsystem including a media projection subsystem and/or a publically accessible access point, such as a Wireless Local Area Network (WLAN) IEEE 802.11 (e.g., WiFi hotspot) or Wireless Personal Area Network (WPAN) (e.g., Bluetooth) access point (AP). Advantageously, the systems can be hung from balconies, windows, walls, and roofs, to name a few examples. The portable billboards can be distinguished from conventional signage in their ability the measure the efficacy of the projected media and/or AP communications. One measurement is location, as some locations attract more attention than others. Another measurement is actual enablement, meaning the times and duration that the media is actually seen by the public. To encourage efficient deployment, the entities owning or managing the portable billboards are rewarded based upon these efficacy measurements. Being portable, the billboards may act as an advertising platform that seeks to expand and capture market share within the outdoor advertising market segment by directing the selective deployment of media and WLAN/WPAN services to preferred target locations. The system may transmit the following information: (i) a unique identifier for the device in use (for example, radio-frequency identification), (ii) the time, date, duration, and location (using global positioning satellite (GPS) or cellular triangulation systems), (iii) an indication that the media projection subsystem has been deployed, and (iv) an indication that the WLAN/WPAN access point is in use. Graphic information system (GIS) mapping technology may be used to compensate a person or business entity associated with the system for operating in specified locations. Accordingly, a portable billboard system is presented including a portable media projection subsystem to selectively project media and to supply an enablement signal in response to the media being projected. Generally, the media projection subsystem is able to display an image and/or broadcast an audio message. Some specific examples of a media projection subsystem include an image projector, a retractable screen, a liquid crystal display, holographic display, a light emitting diode display, a wallscape, switchable glass displays, and combinations thereof. An identifier or identification code is associated with the media projection subsystem and/or an entity associated with the media projection subsystem. A location device supplies the geographic location of the media projection subsystem. A verifier receives the enablement signal, the identification code, and the geographic location, and supplies verification information responsive to the enablement signal, the identification code, and the geographic location. The verifier also supplies an indication that the media has been projected from a stationary location for a predetermined minimum duration of time. A communications subsystem receives verification information and either stores the information for subsequent downloads, or transmits the information to a central controlling server. A targeting subsystem permits an entity to select a target stationary location from a plurality of value weighted target stationary locations. Typically, the target stationary location has a weighted value responsive to factors such as proximate vehicular traffic, line of sight, proximate pedestrian traffic, proximity to cultural events, proximity to cultural facilities, the position of the media (e.g., visibility or height), the type of media being projected, the time of day, the day of the week, the date, the length of time the media is projected, and combinations thereof. The targeting application may provide a reward to the media projection subsystem associated entity in response to a value of the selected target stationary location.

In one aspect, the communications subsystem receives media uploads from the server, which are provided to the media projection subsystem for presentation. In another aspect, a camera supplies images of the geographic location proximate to the media projection subsystem. A monitoring subsystem may measure public exposure to projected media and a handicap subsystem may offset a media value associated with the enablement of the media projection subsystem, calculated in response to the exposure measurements.

For example, the monitoring subsystem may include a camera and a facial direction detection subsystem that accepts images from a camera, selects faces from camera images, and measures the duration of time the faces are directed towards the media projection subsystem.

The system may further include a publically accessible access point, configured for attachment to the media projection subsystem, such as a WLAN, e.g., a WiFi hotspot, a WPAN, e.g., Bluetooth AP, or both a WLAN and WPAN access point. In this case the system may include a communication gauge to measure communication subsystem communication statistics, and the above-mentioned handicap subsystem may offset a communication value associated with the access point in response to the communication statistics.

In one aspect, the system may include a plurality of portable media projection subsystems, so that the combination of media projection subsystems supplies a coordinated mobile media integrated display, with a first portion of the coordinated media being linked to a second portion of the coordinated media. In one variation, at least one of the media projection subsystems is mounted on a ground-based, water-based, or airborne mobile platform.

Additional details of the above-described system and an associated method for monitoring the provision of media distributed from a portable billboard are provided below.

DETAILED DESCRIPTION

Figure 1A:
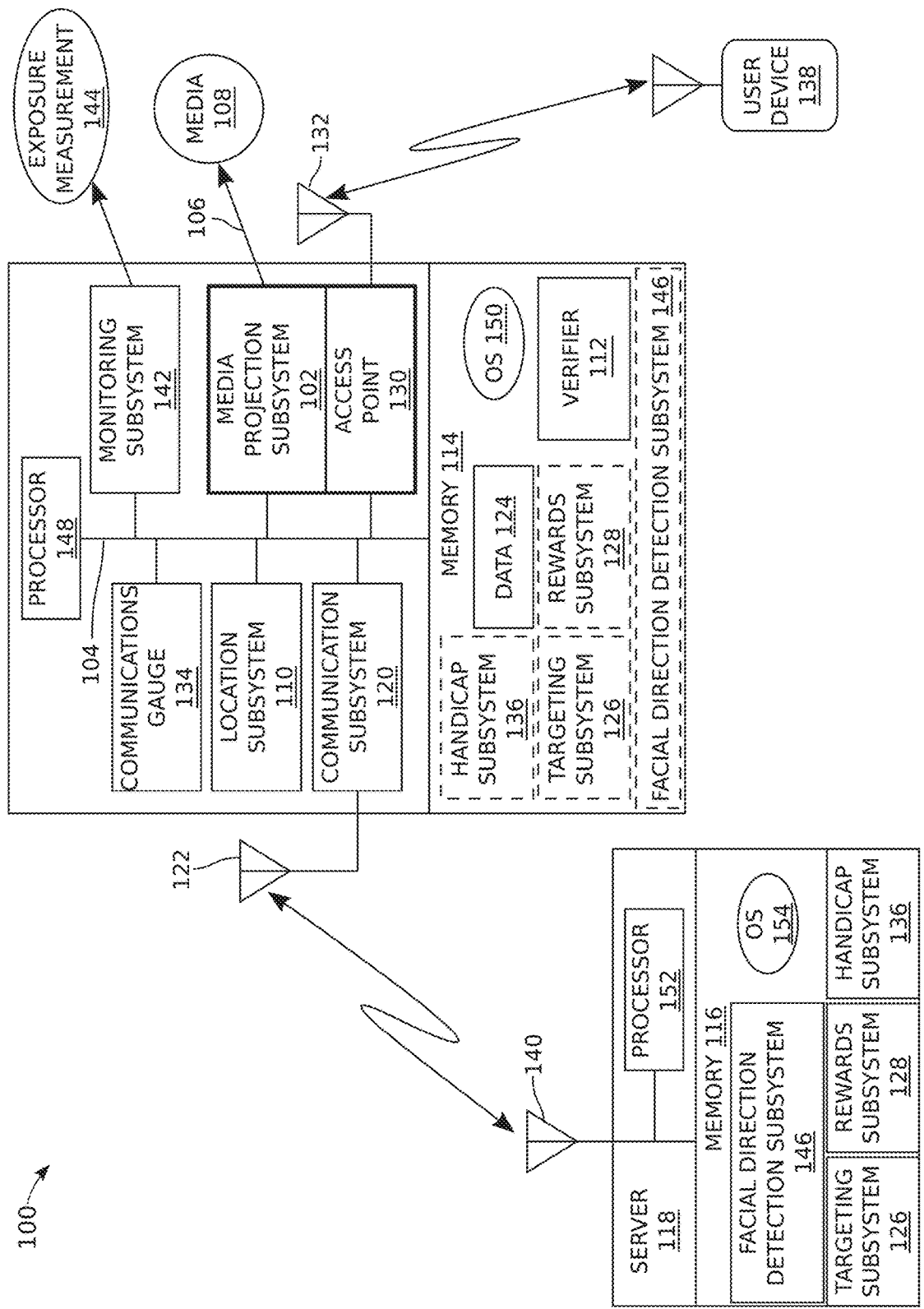
FIGS. 1A through 1D are diagrams depicting a portable billboard system.

FIGS. 1A through 1D are diagrams depicting a portable billboard system. As used herein, the term "portable" may be inferred to mean that the system is light enough so that it can be manipulated by one or two persons. It should also be understood that the term means that the system is not necessarily a fixed permanent fixture wherever currently mounted. However, there is nothing that prevents the system from being permanently or semi-permanently mounted. The term "portable" may also be interpreted to mean that the billboard is not mounted in a predetermined location. The system 100 comprises a media projection subsystem 102, which may be selectively engaged, and which supplies an enablement signal on bus line 104 when enabled. In one aspect, the system may be understood to comprise a chassis, with the media projection subsystem embedded in the chassis. The media projection subsystem 102 has an interface, represented by reference designator 106, to project a form of media 108. Some examples of the media projection subsystem 102 include an image projector, a retractable screen, a liquid crystal display (LCD) or light emitted diode (LED) TV monitor type display, a wallscape, holographic display, switchable glass display (such as made by Gauzy), and combinations thereof. For example, a screen deployment mechanism may wrap and unwrap a flexible screen material around a roller. The media projection subsystem 102 is not limited to any particular type of screen material or deployment means. The media projection subsystem 102 may be selectively engageable to project an image onto the deployed viewing screen. The media projection subsystem 102 may also broadcast audio messages, or a combination for audio and visual messages.

The media projection subsystem 102 may be an image projector enabled as a liquid crystal (LC) or LED display similar to a home theater type video projector. Alternatively, high performance (e.g., mercury arc or xenon arc) lamps, cathode ray tube (CRT), digital light processing (DLP), plasma, silicon X-tal reflective display (SXRD), or red-green-blue (RGB) lasers may be used. The media projection subsystem 102 may also be a persistent image fan or an electroluminescent (EL) display. In other words, the media projection subsystem 102 may be a 2-dimensional or 3-dimensional image, which may or may not be transitory. Transitory images include a series of still images, videos, or combinations thereof.

The media projection subsystem 102 may also include an internal battery and/or cables for attachment to an external power source. The media projection subsystem 102 typically includes miscellaneous electronic circuitry required to support the major components described below, as would well understood in the art. The media projection subsystem 102, or media projection subsystem chassis, may include components for attachment to a wall, window, or balcony, or a stand for mounting on a sidewalk or lawn.

The system 100 further comprises a location subsystem 110 having an output on line 104 to supply a geographic location of the media projection subsystem. Examples of a location subsystem 110 include a Global Positioning Satellite (GPS) system receiver, assisted GPS taking advantage of cell tower data, a Wireless Local Area Network IEEE 802.11 (WiFi) positioning system, cell-site multilateration, satellite multilateration, or a hybrid positioning system. Hybrid positioning systems find locations using several different positioning technologies, such as GPS, combined with cell tower signals, wireless internet signals, Bluetooth sensors, IP addresses, and network environment data. Cell tower signals have the advantage of not being hindered by buildings or bad weather, but usually provide less precise positioning. WiFi positioning systems may give very exact positioning in urban areas with high WiFi density, depending on a comprehensive database of WiFi access points. Further, a LORAN type system or LoJack® type system might be adapted for the purpose of location determination. As noted in U.S. Pat. No. 10,796,340, which is incorporated herein by reference, camera images and the location data of proximate smartphones, laptops, and personal communication devices can also be used to determine location.

A verifier, or verification subsystem, 112 has an interface on line 104. Here, the verifier 112 is enabled as a software application stored in local non-transitory memory 114, including processor executable instructions to receive the enablement signal, an identification code, the geographic location, to supply verification information responsive to the enablement signal, the identification code, the geographic location, and the media being projected from a stationary location for a predetermined minimum duration of time. The predetermined minimum duration of time may be a fixed value, such as 5 minutes. Alternatively, the predetermined duration of time may vary due to location, time of day, and the type of media, to name a few examples. Alternatively, some components of the verifier may be enabled in hardware. As another alternative, some software modules of the verifier may be stored in the non-transitory memory 116 of server 118.

The system 100 includes a communications subsystem 120 having an interface on line 104 to accept verification information and an interface to communicate the verification information. As shown, the communications subsystem 120 is a wireless transceiver with antenna 122. The most typical examples of a wireless communication subsystem 116 are cellular systems (e.g., Global System for Mobile Communications (GSM), Universal Mobile Telecommunications System (UMTS)-time division duplexing (TDD), Long-Term Evolution (LTE), $4^{th}$ Generation (4G), or $5^{th}$ Generation (5G)), and the like. Less typically, the communications subsystem 120 may be enabled with WLAN IEEE 802.11 (WiFi), or even Long Range Wireless transceiver. Some examples of a Long Range Wireless system include Digital Enhanced Cordless Telecommunications (DECT), Evolution-data Optimized (EVDO), General Packet Radio Service (GPRS), High Speed Packet Access (HSPA), IEEE 802.20 (iBurst), Multichannel Multipoint Distribution Service (MMDS), Muni WiFi, commercial satellite, and IEEE 802.16 Worldwide Interoperability for Microwave Access (WiMAX (WiBro)). As another alternative, the communication subsystem may store verification information and other communication messages in the system local memory 114 as data 124, which may be periodically downloaded using a wireless or hardwire connection. The system 100 is not limited to any particular type of communication subsystem. In one aspect, the communications subsystem 120 receives media uploads from the server 118, which it provides to the media projection subsystem 102, via line 104, for presentation.

A targeting subsystem 126 is used for selecting a media projection subsystem target stationary location from a plurality of potential target stationary locations having corresponding location values. As shown, the targeting subsystem is enabled as software application stored in server memory 116, and includes a sequence of processor executable steps for selecting the target location. The target location can be selected from the media projection subsystem or from the server. Alternatively, the targeting subsystem can be stored in the media projection subsystem local memory 114, as shown in phantom. In one aspect of the system 100, a rewards subsystem 128, which may alternatively be considered a sub-module of the targeting subsystem, provides a reward to an entity in response to the selected target stationary location. The entities receiving rewards may include the entity managing the media projection subsystem, an entity managing the server, an entity owning the property upon which the media projection subsystem is located, or combinations of the above-mentioned entities. As such, the rewards subsystem 128 is typically enabled as software application stored in server memory 116, and includes a sequence of processor executable steps. Alternatively as shown in phantom, the rewards subsystem may be stored in local memory 114.

In another aspect, the system 100 further comprises a publically accessible access point (AP) 130. The AP 130 may be an IEEE 802.11 Wireless Local Area Network (WLAN), such as a WiFi hotspot, an IEEE 802.15 Wireless Personal Area Network (WPAN), such as Bluetooth access point, or both a WLAN and WPAN access point, connected to antenna 132. Alternatively, but less common, the access point 130 may an IEEE 802.15.4 Zigbee, WPAN IEEE 802.15 Li-Fi or wireless USB device. Even more unlikely as an access point are Long Range Wireless systems. In the case of the WiFi or Bluetooth access point being a component of the communications subsystem 120 (e.g., communicating with server 118), items 130 and 120 may be collocated. As used herein, a "publically accessible" AP is an AP that can be accessed by the general public without a password or similar security measures, or where the password is publically distributed. One example of a publically accessible AP is the WiFi hotspot service provided by a typical Starbucks coffee shop. In the case of a password being required for access, the password may be printed on the mobile platform, displayed by the media projection subsystem, or made available through a media projection phone application or website. In one aspect, a communication gauge 134 has an output on line 104 to supply a measurement of communication subsystem communication statistics. In one aspect not shown, components of the communication gauge may be enabled at least partially as a software application stored in either local memory or the server memory. A handicap subsystem 136 has an interface to offset a communication value associated with the access point 130, or with communications subsystem 120, in response to the communication statistics. Typically, the handicap subsystem 136 is enabled as a software application stored in either local memory 114 (as shown in phantom) or server memory 116.

A number of ways are known in the art for measuring the effectiveness of radio frequency (RF) communications, which can be used to enable the measurement communication statistics. Some examples include the measurement of bit error rate (BER) and signal strength. Some components of the communication gauge may be enabled in software. The rewards application 128 may provide a reward to an entity in response to the communication value offset by the communication statistics. The reward may be calculated in combination with the value of the target location, efficacy, and presentation times and durations.

There are two basic links involving the AP 130. One link is between the AP enabled media projection subsystem 102 and the central controller server 118, via communications subsystem 120. This linkage, and thus the communication statistics, should remain relatively consistent as long as the media projection subsystem remains stationary in one particular location. The other linkage is between the AP 130 and user devices 138, such as smartphones, laptops, and personal communication devices. These communication statistics are more likely to vary in that users may only be connected to the AP 130 for short periods of time, and the users may be changing their locations while they are connected.

In one aspect, the access point 130 and/or communications subsystem 120 can be used to collect data from entities passing by, or engaging with the access point or using the communications subsystem 120. This data can be stored in local memory 114 for subsequent recovery or transmitted to server 118.

The system 100 may include a camera 138 to record images of the geographic location proximate to the media projection subsystem 102. The camera images may be stored in local memory 114, or the communications subsystem 120 may transmit the images to server 118. In one aspect, the camera may also be used to modify the value of the target location. For example, the recorded traffic in a location may be greater than anticipated, and the target value adjusted accordingly. That is, images recording higher pedestrian or vehicular traffic may have greater value. The data may be used to help determine the efficacy of the media or location. Alternatively or in addition, the camera images my act to verify that the media projector subsystem has been enabled, the media projection subsystem 102 is stationary, or the media projection subsystem is located in a particular location. In one aspect, simply recording a change in images, and thus proximate traffic, can be used as a means for proving media projector subsystem enablement. As an alternative, or in addition to the camera, the system may further comprise a proximity detector subsystem to sense nearby motion, or to measure the density of proximate vehicular or foot traffic, which data is transmitted by the communications subsystem or recorded in local memory.

As noted above, the system 100 may further comprise a server 118 having an interface, represented as antenna 140, to accept the verification information from the communication subsystem 120, and having a server memory 116 to store the verification information. The server 118 may be associated with an entity that manages the server and media, and/or a client entity benefiting from the media presentation. If the media projection subsystem is managed by a different entity than the one(s) associated with the server, this different entity may be the one that selectively enables the media projection subsystem and selects the location.

The system may further comprise a monitoring subsystem 142 having an interface represented by reference designator 144 to measure public exposure to projected media and an output on line 104 to supply exposure measurements. The monitoring subsystem 142 may be enabled through the use of a component such as a camera, sonar, LIDAR, a photodetector ranging subsystem, and combinations thereof. Typically, these components are mounted with media projection subsystem 102 or the media projection subsystem chassis.

Figure 1B:
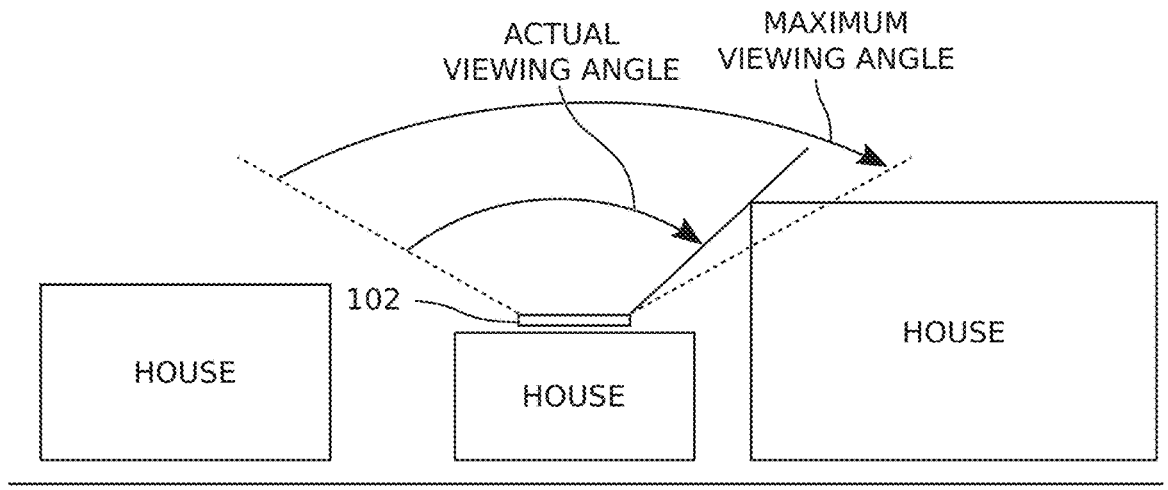
Figure 1C:
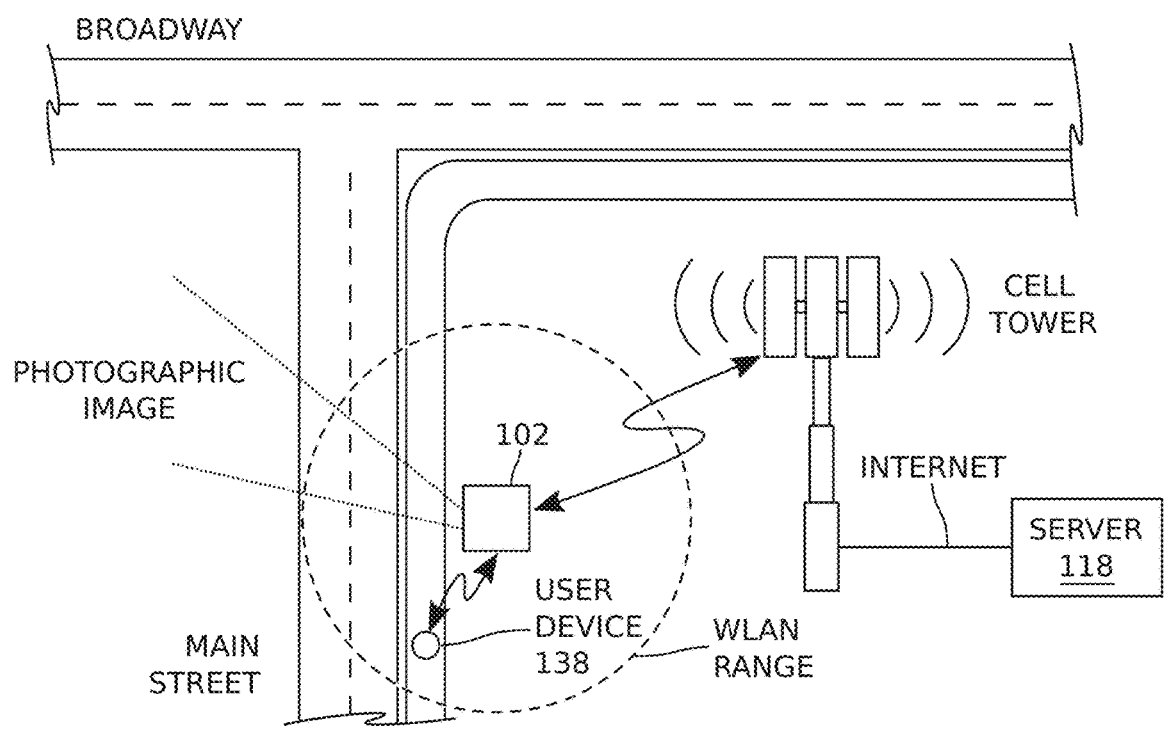

In one form, the monitoring subsystem 142 measures an actual media projection subsystem viewing angle, as shown in FIG. 1B. The dotted lines represent a maximum possible viewing that may be limited by the media image that can be realistically perceived by the human eye or a camera. In the case of an LED or LCD display, the maximum (side) viewing angle is restricted due to limitations inherent to the technology. The solid lines represent the actual viewing angles. Here, a portion of the viewing angle associated with media projection subsystem 102 is blocked by a neighboring house. Otherwise, as mentioned above, the camera 138 may "measure" the audience, in terms of traffic and/or pedestrian density, or time of day. In other aspects, the monitoring subsystem 142 may measure exposure degradation due to weather conditions, in which case the monitoring subsystem may include a rain gauge. Other exposure factors may include ambient light, the angle of the sun (making the display hard to read), or traffic. For example, if traffic is stopped with a car blocking the media projection subsystem display, that might be considered an exposure degradation. Further, if traffic is going by faster that a predetermined limit, that might also be considered an exposure degradation. Weather and traffic related data may also be obtained from external monitoring systems, conventional Internet websites, or conventional mobile phone applications.

The handicap subsystem 136 can also be used to offset a media value associated with the enablement of the media projection subsystem, calculated in response to the exposure measurements. In other words, each type of media presented by the media projection subsystem 102 need not necessarily have the same value. For example, in the case of an advertisement, some clients may be willing to pay more for the presentation of their media than other clients. Thus, the differences in payment represent differences in nominal media values. Regardless of whether the media values have different nominal values, these media values can be adjusted based upon the quality of the presentation. For example, the media values may be based on a presentation with a maximum viewing angle, and if the monitoring subsystem 142 measures a degradation in viewing angle, the media value can be adjusted downward. In the case of advertising media, an offset in media value may result in reduced cost for the advertising client and/or reduced rewards for entities associated with the media presentation.

In one aspect, a facial direction detection subsystem 146 has an interface to accept images from the camera 138, and is able to select faces from camera images and measure the duration of time the faces are directed to the media projection subsystem. This "face-time" measurement is another means of measuring media exposure. The facial direction detection subsystem 146 may be enabled as a software application stored in server memory 116, with processor executable steps for measuring face direction duration. Less likely due to memory and processor constraints, the facial direction detection application may be embedded in local memory 114, as shown in phantom.

Facial recognition systems have become well known in the art. Further, variations on these systems have been used to adjust camera position, to optimize facial recognition, such as described in US 2021/0034843. The detection of facial direction, which is the direction in which a human's eyes are directed, is a substantially simpler task than recognizing facial characteristics that permit an individual to be identified.

As noted above, the rewards subsystem 128 may provide a reward to an entity in response to the media value, offset by the exposure measurement. As used herein, an "entity" may be a person, a business, a corporation, or any type of social organization or business unit able to claim ownership of, or association with, the identification code, media projection subsystem 102, system 100, a central control server 118, a land owner on which the media projection subsystem is positioned, or server clients. Typically, the rewards subsystem 128 would be embedded as a software application in server memory 116 because the server 118 is likely to have greater storage and processing capacity, but alternatively, it may be stored in local memory 114, as shown in phantom.

As would be understood in the art, the media projection subsystem 102 would comprise a processor 148 cooperating with software applications in non-transitory local memory 114. The non-transitory memories described herein may be any type or form of non-volatile storage device or medium capable of storing data and/or other computer-readable instructions. Examples of memories include, without limitation, Read Only Memory (ROM), flash memory, or any other suitable memory device. Although not required, in certain embodiments, the system described herein may include both a volatile memory unit and a non-volatile storage device. The memory may be implemented as shared memory and/or distributed memory in a network device.

As is common in many computer systems, processor 148, which may include a peripheral interface, is connected to the bus line 104 to pull operating instructions from operating system (OS) 150 and software applications in memory 114, and manage communications between the various components of system 100. Likewise, server 118 would be enabled through the use of processor 152 and OS 154. For ease of understanding, the above-described functions have been described as individual components. However, it should be understood that in practice, multiple functions may be performed by a single device, subsystem, or software application.

Figure 1D:
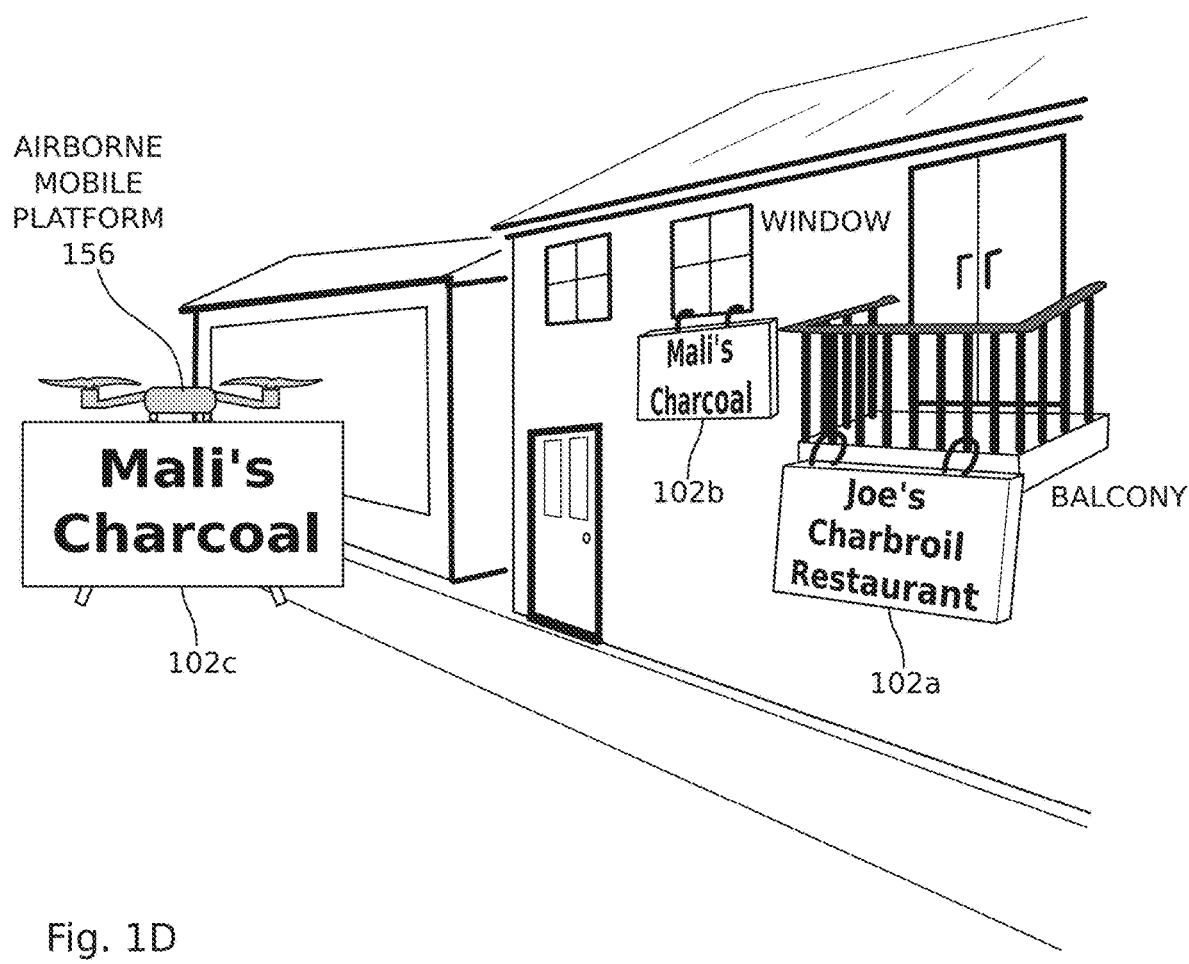

As shown in FIG. 1D, the system 100 may further comprise a plurality of portable media projection subsystems. Shown are media projection subsystems 102a and 102b, with media projection subsystem 102a mounted from a balcony and media projection subsystem 102b hanging from a window. As explained in greater detail in parent application Ser. No. 17/179,574, which is incorporated herein by reference, the combination of media projection subsystems supplies a coordinated media integrated display, with a first portion of the coordinated media being linked to a second portion of the coordinated media. Alternatively, or in addition, the system may further comprise a media projection subsystem 102c mounted on a mobile platform such as a ground-based (e.g., automobile) or water-based (e.g., boat) mobile platform, or as shown, an airborne (e.g., drone) mobile platform 156. In this example, media projection subsystems 102a and 102c also form the coordinated media integrated display.

Figure 2:
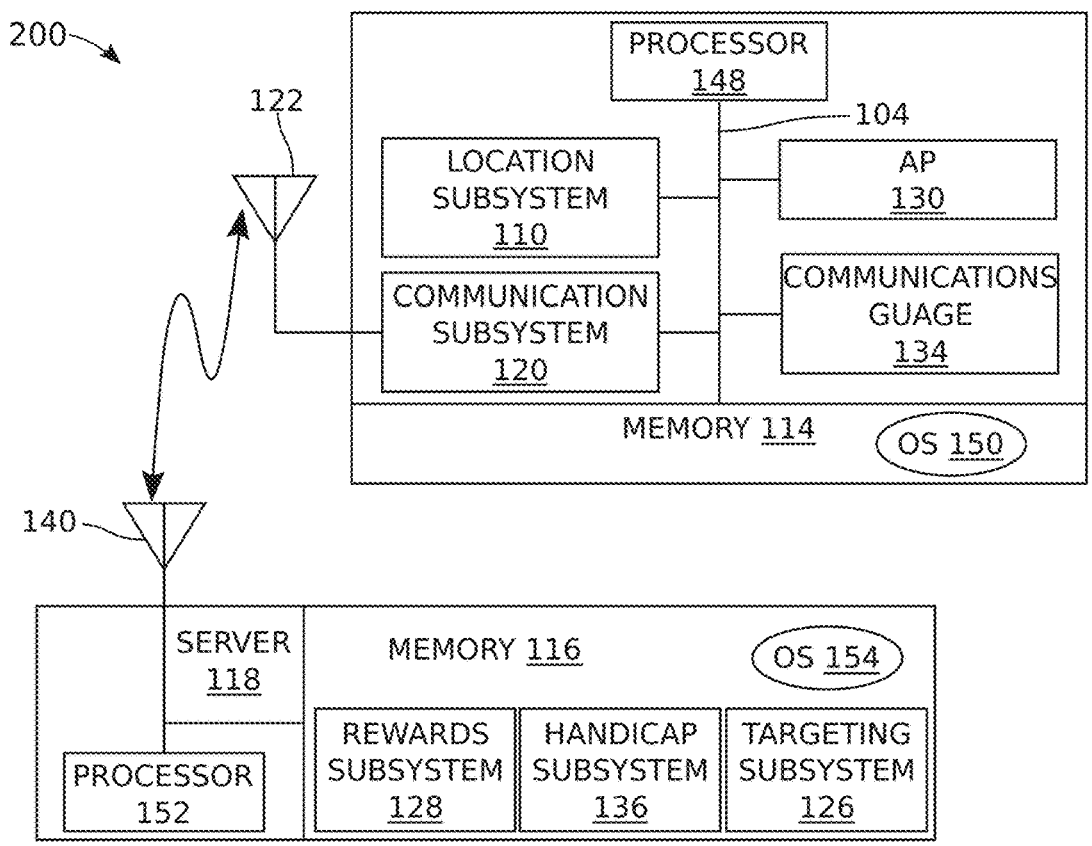
FIG. 2 is a schematic block diagram depicting a portable access point system.

FIG. 2 is a schematic block diagram depicting a portable access point system. The system 200 comprises a publically accessible access point 130, which may be selectively engaged. The AP 130 may be a WLAN (e.g., WiFi hotspot)), a WPAN (e.g., Bluetooth), or both a WLAN and WPAN access point. The AP 130 has an interface on line 104 to supply an enablement signal in response to being enabled. A location device 120 supplies the AP geographic location on line 104. A verifier 112 has an interface on line 104 to receive the enablement signal, the identification code, the geographic location, and to supply verification information including an identification code, the enablement signal, the geographic location, in response to the AP being enabled in a stationary location for a predetermined minimum duration of time. A communications subsystem 120 has an interface on line 104 to receive verification information and an interface connected to antenna 122 to communicate the verification information. In some aspects, the communications subsystem 120 also transceives AP communications with a central control server 118. A targeting subsystem 126 permits an entity to select a target stationary location from a plurality of value weighted target stationary locations. A rewards subsystem 128 may provide a reward to an entity in response to the selected stationary location. As shown, the rewards subsystem 128 and targeting subsystem 126 are enabled as software applications in server memory 116. Alternatively but not shown, the targeting and rewards subsystems may be stored in local memory 114.

Figure 3:
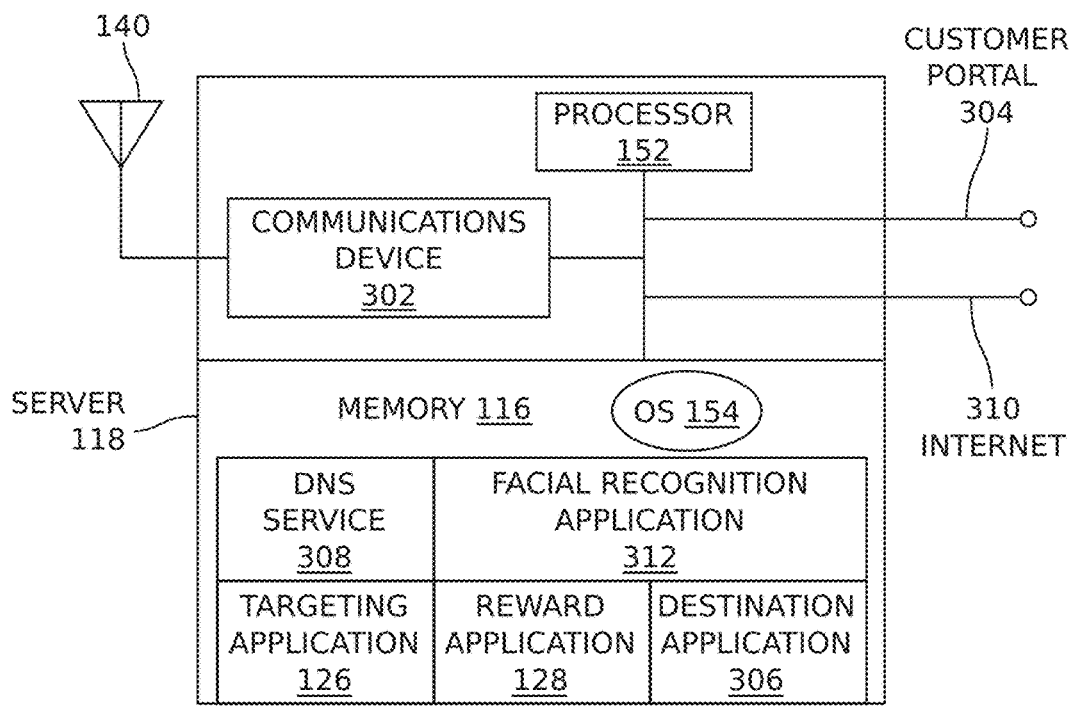
FIG. 3 is a schematic block diagram of the server depicted in FIGS. 1A and 2.

FIG. 3 is a schematic block diagram of the server depicted in FIGS. 1A and 2. For convenience, all the components associated with server 118 are shown embedded as a single schematic block, but it should be understood that these components are not necessarily embedded in a single hardware unit or server, or in communication with each other. Alternatively, the software applications may be cooperating components of an overall software system. The server may also represent a network of servers in communication with each other. As shown, the server 118 is connected to antenna 140 through communications device 302, to receive the verification information, and in some aspects, transceive AP communications and other information with the system (100, see FIG. 1A). Although depicted as a wireless communications system, it should be understood that the linkage represented by the communication device may represent Internet and Ethernet linkages to cell tower base stations and cloud search engines, or any other means of communication, and may generally be referred to as portal.

A second interface on line 304, also referred to as a customer portal, receives client goals such target market, deployment hours, deployment rate, and positions to name a few examples. The customer portal on line 304 may also receive explicit destination and/or media selection instructions from an entity (e.g., a client or server provider). Alternatively, a destination application 306 is embedded in memory 126, including processor instructions for automatically (without direct human intervention) determining the destination instructions in response to client goals. In one aspect, the destination application is a machine learning (ML) model that is trained by sampling a plurality of manual instructions previously supplied by the second entity, and which infers destinations from the model. Destination instructions may also be responsive to the targeting 126 and rewards application 128. The client goals and targeting may be responsive to factors such as location, local demographics, traffic, population density, length of deployment, and combinations thereof. An operating system 154 works in cooperation with the processor 152 to enable software applications in memory 116 and to process information to-and-from communications device 302.

Considering FIGS. 1A, 2 and 3, the access point 130 and communications subsystem 120 can be used to support a type of data mapping. The access point is publically accessible to user devices 138 that include smartphones, personal devices, or generally any type of computing device. Typically, the user devices 138 are enabled for WiFi and Bluetooth communications. If left enabled, as is the typical case for many users, the user device is able to interact with a nearby access point even if a communication data link is not established. As used herein, the term data mapping includes the collection of data from the user devices 138. In one aspect, user data information (e.g., addresses) is collected voluntarily, with the user explicitly agreeing to data collection in response to an access point provided services, such as the provision of an Internet browser, email, Internet, or social media services. For example, if the access point 130 is a WiFi hotspot that accepts Uniform Resource Locator (URL) address requests from a user device (e.g., a smartphone), the URL address requests may be transmitted to a Domain Name System (DNS) service 308 embedded with server 118. The DNS service 308 makes address searches, if necessary, via the Internet interface on line 308. Likewise, the customer portal may be enabled using the Internet interface on line 310. Otherwise, the information is collected without an explicit agreement by the user, where legal. Rewards to entities may be based upon the volume of traffic through the WiFi hotspot or access point data collected. In some aspects, camera images, in cooperation with a facial recognition software application 312 (e.g., DeepFace), are used for data tracking.

Figure 4:
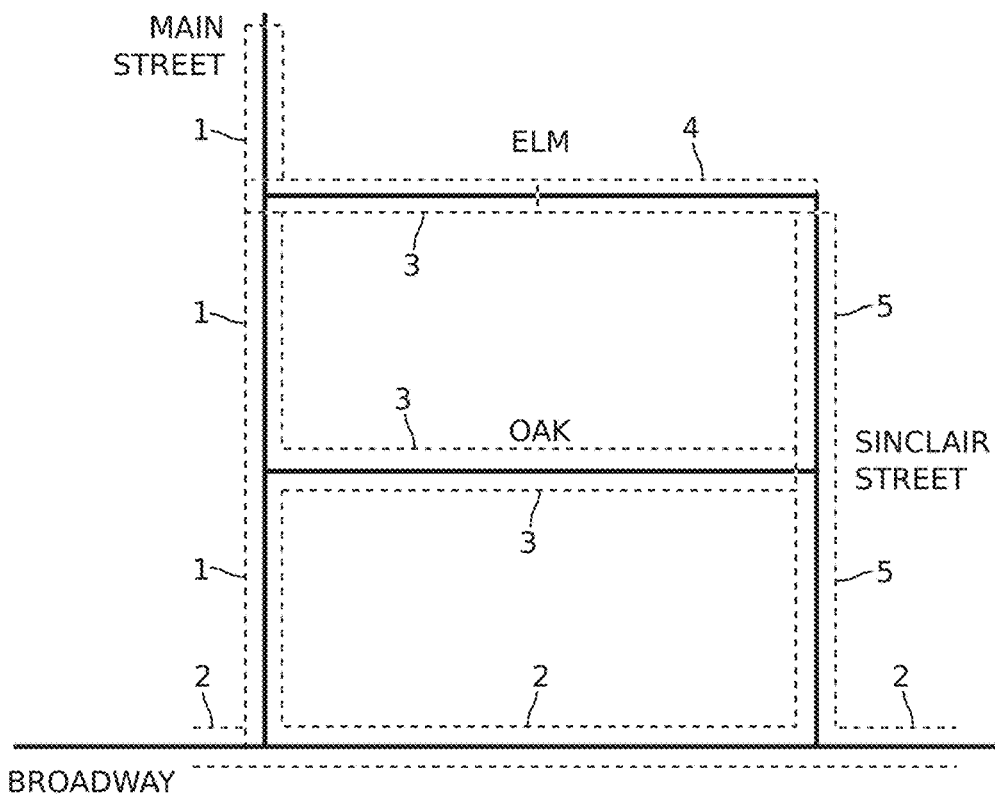
FIG. 4 is a plan view of geographic regions cross-referenced to the weighted value of various stationary positions.

FIG. 4 is a plan view of geographic regions cross-referenced to the weighted value of various stationary positions. As shown, regions along Main Street have a value of 1, the highest rated value. The regions along Broadway have a value of 2. The regions along Oak have a value of 3. The region along Elm near Main Street have a value of 3, which decreases to a value of 4 near Sinclair Street, and the regions along Sinclair Street have a value of 5.

The systems described above can be adapted for use in a model where an advertiser or commercial entity pays for service based upon performance. For example, an advertising (server) client may contract with a system provider stipulating a target market and deployment hours/rate. The system provider (intermediary organization) determines geo-fenced locations that meet or exceed the advertiser's target market based on location, demographics, traffic, population density, and other variables. Platform deployment time, location, quality code, and user information are recorded by the server. A system provider algorithm determines platform performance based on length of deployment, contracted rate, maintenance cost reimbursement, and location quality code.

The systems described above support a targeted location system, where the portable billboard or access point may be selectively deployed. In cooperation with the deployment of the display and/or access point, an organization or associated user is directed to preferred locations. For example, the deployment of the sign along a busy urban thoroughfare is likely to have a greater value than deployment on a suburban side-street. Other factors that may be used to calculate target value may include the time of day and the length of deployment. Thus, some key features to the system are determining that the display and/or access point have actually been deployed, and once deployed, the location of the system.

Figure 5:
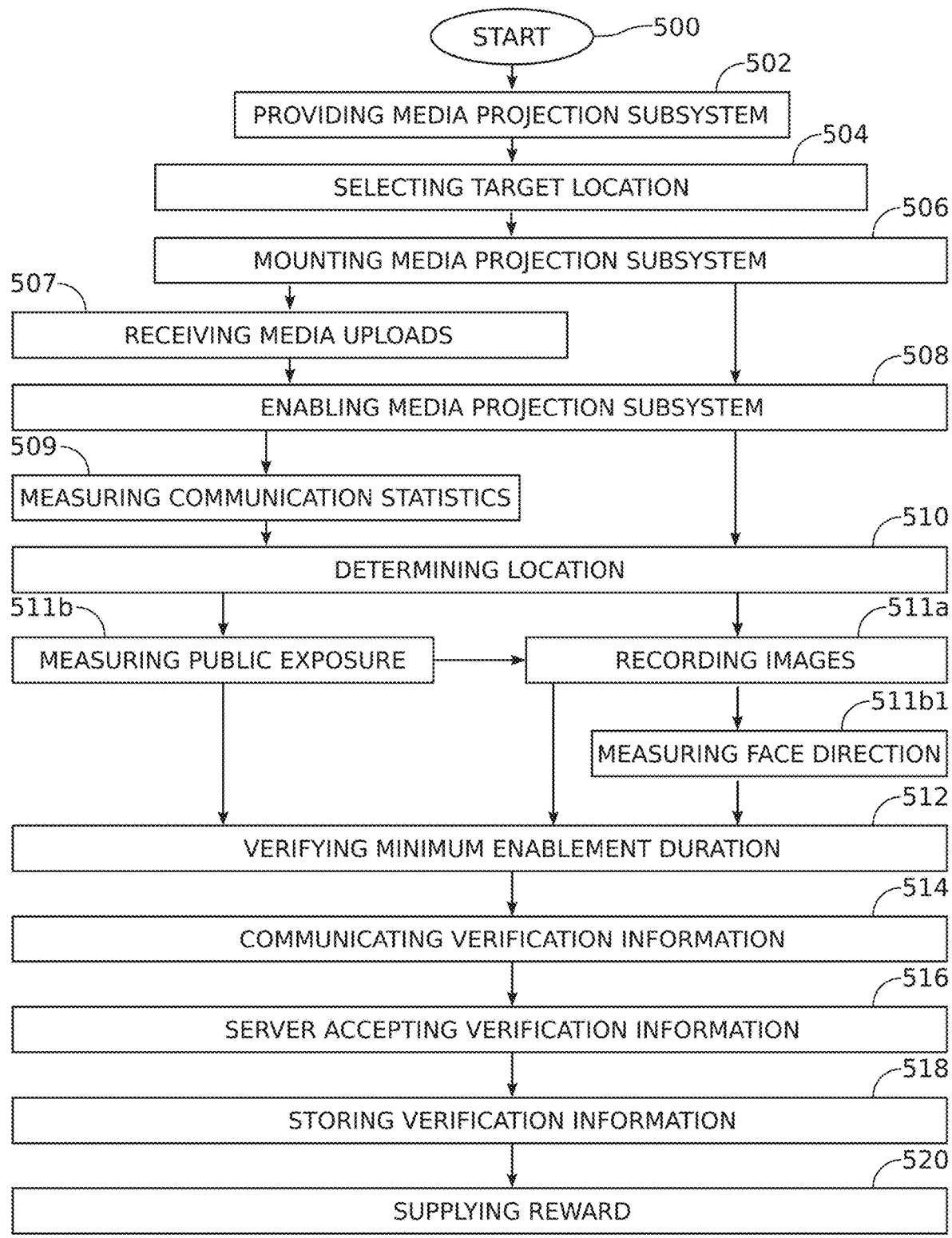
FIG. 5 is a flowchart illustrating a portable billboard method.

FIG. 5 is a flowchart illustrating a portable billboard method. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. The method steps are supported by the above system descriptions and, generally, the method follows the numeric order of the depicted steps. The method starts at Step 500.

Step 502 provides a portable media projection subsystem capable of being stationarily mounted. Typically, an identifier is associated with the media projection subsystem and/or a first entity. In Step 504 an entity selects a target stationary location from a plurality of value weighted target stationary locations. In one aspect, an entity managing the billboard or mounting the billboard selects the location. In Step 506 the portable media projection subsystem is mounted in the selected stationary location. Subsequent to mounting the media projection subsystem, Step 508 selectively enables the media projection subsystem. In one aspect, Step 507 receives media uploads from a server and in Step 508 the media projection subsystem projects the media uploads.

Step 510 determines the geographic location of the media projection subsystem. Step 512 verifies the enablement of the media projection system, the identifier (if supplied), the geographic location, and the maintenance of the stationary location for a predetermined minimum duration of time. Step 514 communicates verification information by transmission to a server or by storing the information in local memory for subsequent downloading. In one aspect, in Step 516 a server accepts the communicated verification information, and in Step 518 stores the verification information in a server non-transitory memory. In another aspect, the server is associated with a second entity, such as a server provider or server client, and in Step 508 a first entity associated with the billboard selectively enables the media projection subsystem. In some aspects, either the first or second entity selects the target stationary location, and either the first or second entity may enable the media projection subsystem. Optionally, Step 520 supplies a reward responsive to the value of the selected target stationary location.

In one variation, Step 502 provides a publically accessible access point, which may be WLAN, WPAN, and both a WLAN and WPAN access point. In that case, Step 509 may measure communication subsystem communication statistics and Step 520 may offset a communication value associated with the access point in response to the communication statistics. In another variation, Step 511a records photographic images of the geographic location proximate to the media projection subsystem. Alternatively or in addition, Step 511b may measure public exposure to projected media and supply exposure measurements, and Step 520 may offset a media value associated with the enablement of the media projection subsystem, calculated in response to the exposure measurements. In one variation, measuring public exposure includes recording photographic images of the geographic location proximate to the media projection subsystem in Step 511a, and Step 511b1 selects faces from photographic images and measures the duration of time the faces are directed to the media projection subsystem.

In one aspect, Step 502 provides a plurality of portable media projection subsystems, and enabling the media projection subsystem in Step 508 includes the combination of media projection subsystems supplying a coordinated media integrated display, with a first portion of the coordinated media being linked to a second portion of the coordinated media. In one variation, at least one of the media projection subsystems is mounted on a ground-based, water-based, or airborne mobile platform.

Figure 6:
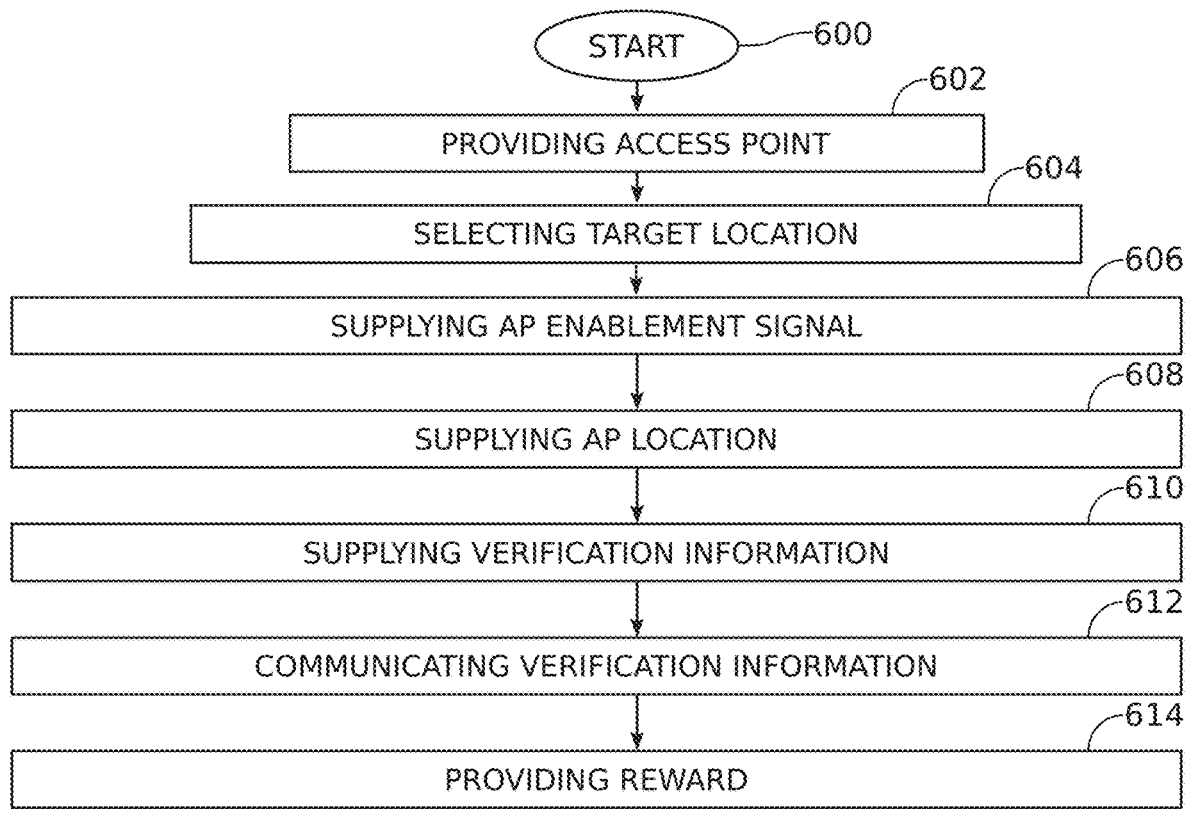
FIG. 6 is a flowchart illustrating a method for supplying a portable access point.

FIG. 6 is a flowchart illustrating a method for supplying a portable access point. The method starts at Step 600. Step 602 provides a publically accessible access point (AP) associated with a first entity, which may be a WLAN, WPAN, or both a WLAN and WPAN access point. In Step 604 an entity selects a target stationary location from a plurality of value weighted target stationary locations. Step 606 supplies an enablement signal in response to the AP being enabled. Step 608 supplies a geographic location of the AP. Step 610 supplies verification information including an identification code associated with the AP or first entity (if supplied), the enablement signal, and the geographic location, in response to the AP being enabled in a stationary location for a predetermined minimum duration of time. Step 612 communicates the verification information by transmitting the information to a server or storing the information for subsequent download in a local memory. In one aspect, Step 614 provides a reward responsive to the value of the selected stationary location. A first entity may be associated with the AP, or a second entity associated with the server provider or server client, may select the target location, and either entity, or both, may be eligible for rewards.

Figure 7:
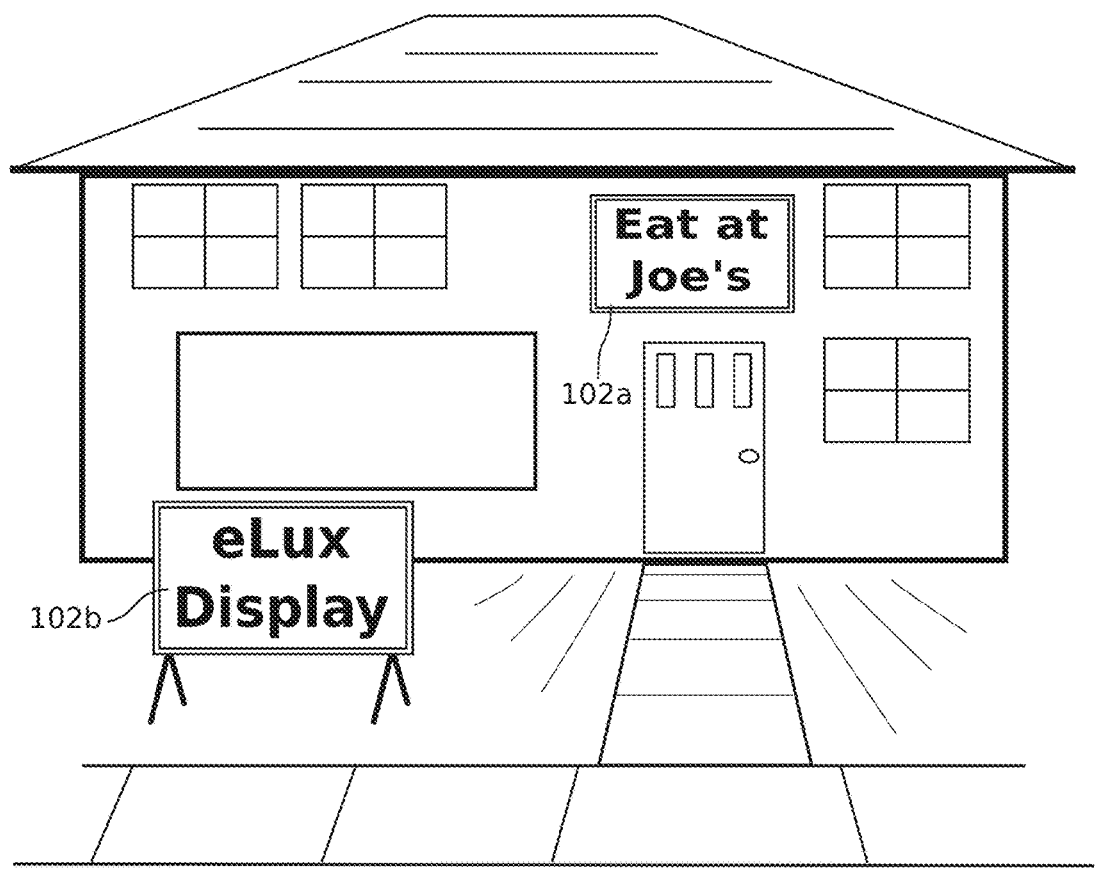
FIG. 7 is a drawing depicting a portable billboard media projection subsystem mounted on the wall of a building, and another erected on the front lawn of the building.

FIG. 7 is a drawing depicting a portable billboard media projection subsystem mounted on the wall of a building, and another erected on the front lawn of the building. The wall mounted media projection subsystem 102a is powered via an AC cord plugged into a building power outlet, while the media projection subsystem 102b erected on the lawn is powered with an internal battery.

Figure 8:
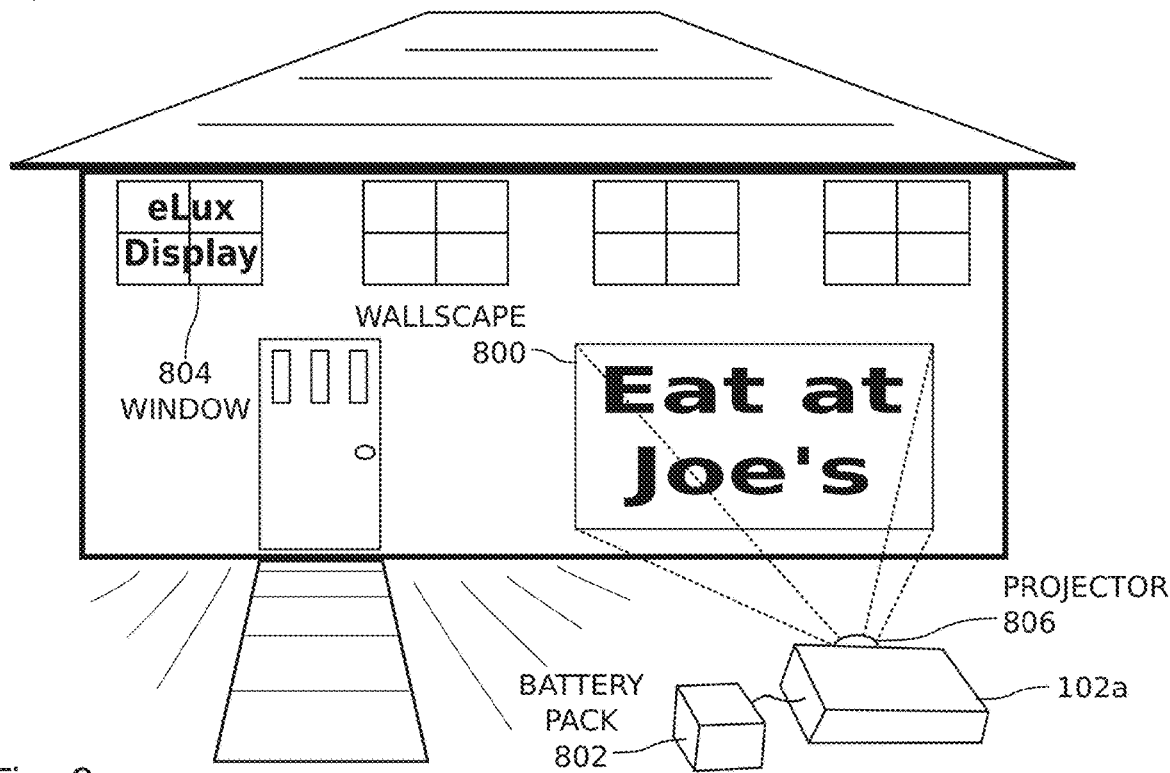
FIG. 8 is a drawing depicting a portable billboard media projection subsystem enabled as an imaging projector.

FIG. 8 is a drawing depicting a portable billboard media projection subsystem enabled as an imaging projector. A media projection subsystem 102a imaging projector 806 creates a wallscape 800 on the exterior surface of a building and is powered by an external battery pack 802. An imaging projector (not seen) backlights window 804 to create an image.

Figure 9:
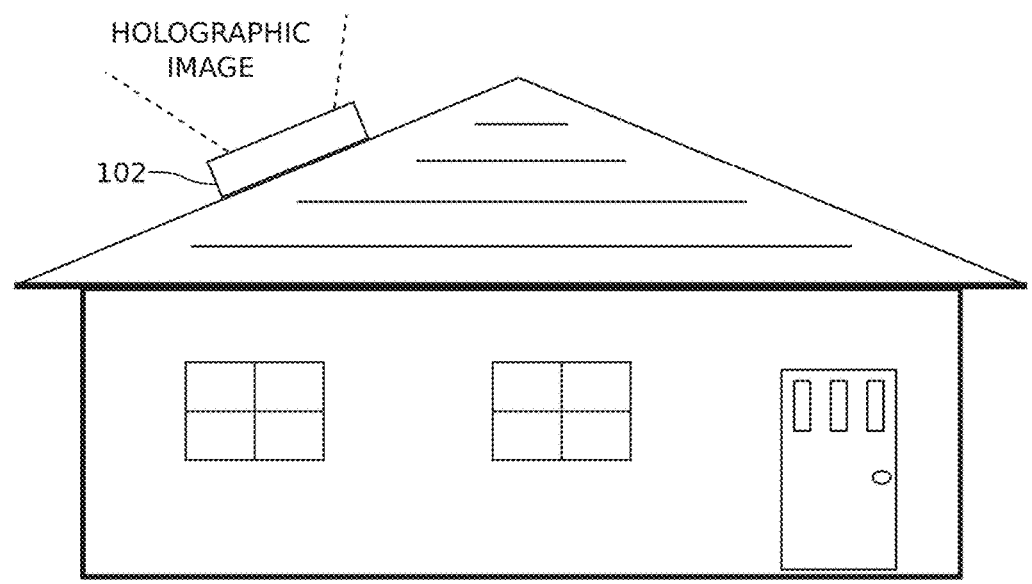
FIG. 9 is a drawing depicting a portable billboard media projection subsystem enabled as a holographic image on the roof of a building.

FIG. 9 is a drawing depicting a portable billboard media projection subsystem enabled as a holographic image on the roof of a building.

Figure 10:
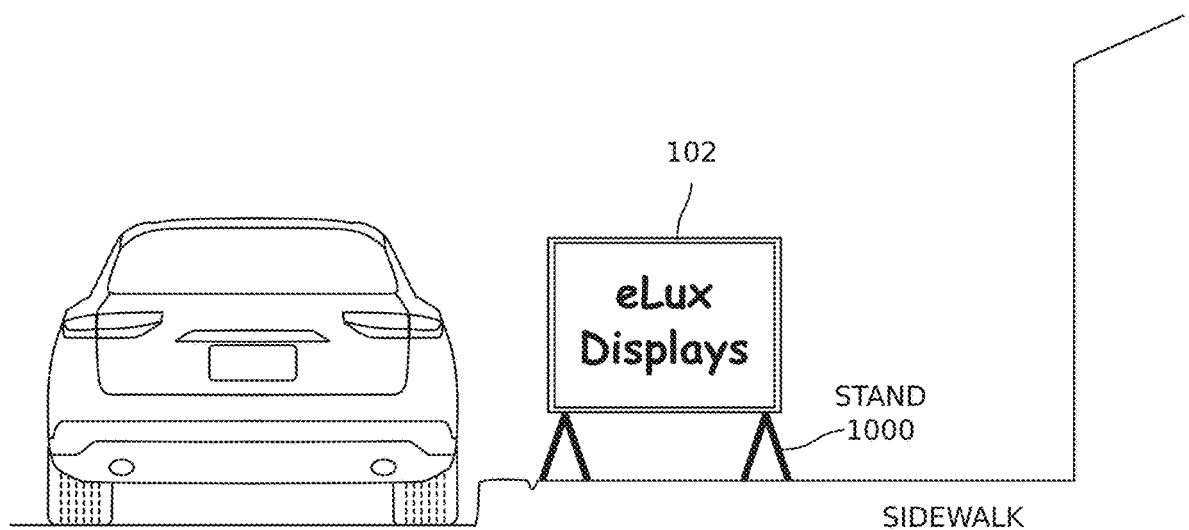
FIG. 10 is a drawing depicting a portable billboard media projection subsystem enabled as an LCD, LED, EL, or static image screen on a sidewalk sandwich board.

FIG. 10 is a drawing depicting a portable billboard media projection subsystem enabled as an LCD, LED, EL, or static image screen on a sidewalk sandwich board. The media projection subsystem is supported by a stand 1000.

Figure 11:
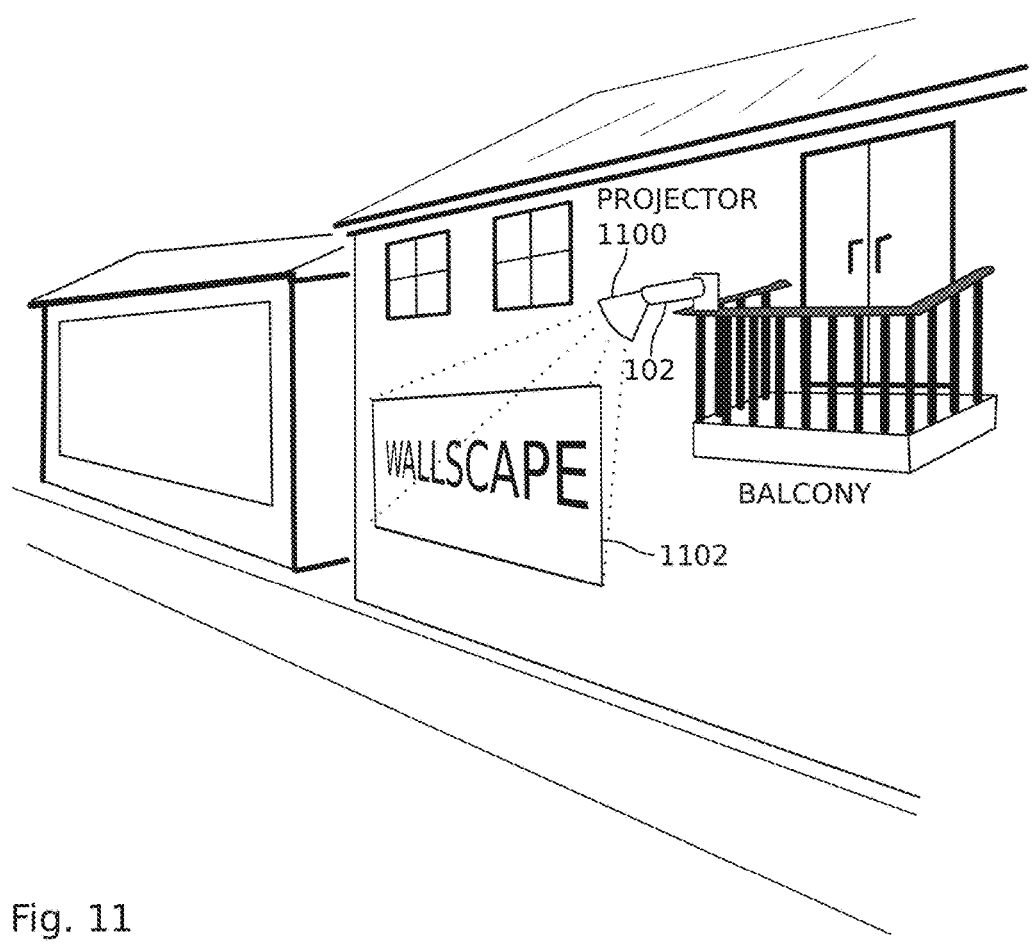
FIG. 11 is a drawing depicting a portable billboard media projection subsystem enabled as an imaging projector.

FIG. 11 is a drawing depicting a portable billboard media projection subsystem enabled as an imaging projector. In this case the media projection subsystem 102 is mounted from a building balcony and the imaging projector component 1100 creates a wallscape image 1102 on the side of a building.

Figure 12:
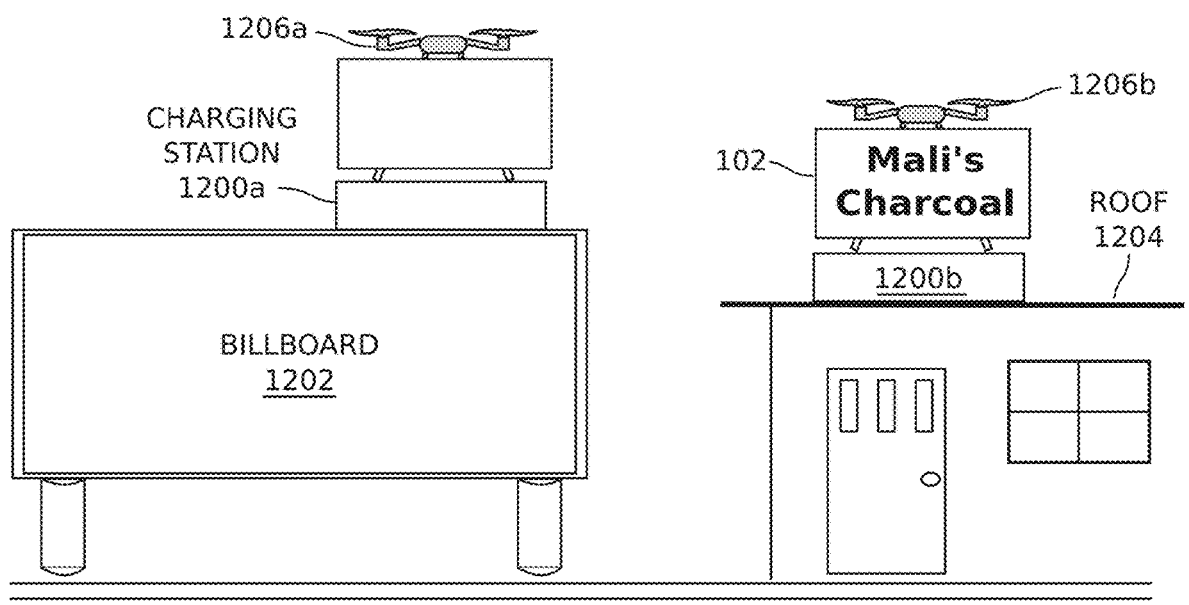
FIG. 12 is a drawing depicting a "bird's nest" drone recharging station.

FIG. 12 is a drawing depicting a "bird's nest" drone recharging station. Recharging station 1200a is located atop a billboard 1202 and recharging station 1200b is located atop the roof 1204 of a building. As shown, the media projection subsystem of drones 1206a is not enabled during charging. Depending on the design as shown, one drone type (1206b) is able to project media while perched on the charging stations, and thus act as portable billboards, regardless of whether it is being charged. In other words, the charging stations may function as portable billboard stationary locations.

Systems and methods have been provided for a portable billboard and portable access point. Examples of particular message structures, schematic block linkages, and hardware units have been presented to illustrate the invention. However, the invention is not limited to merely these examples. Other variations and embodiments of the invention will occur to those skilled in the art.

We claim:

1. A portable billboard system comprising:
a portable media projection subsystem comprising an interface to selectively project media and an interface to supply an enablement signal in response to the media being projected;
a location device to supply a geographic location of the media projection subsystem;
a verifier having an interface to receive the enablement signal, the geographic location, and an interface to supply verification information including the enablement signal and the geographic location, in response to the media being projected from a stationary location for a predetermined minimum duration of time;
a communications subsystem having an interface to receive verification information and an interface to communicate the verification information; and,
a targeting subsystem permitting the selection a target stationary location from a plurality of value weighted target stationary locations.

2. The system of claim 1 wherein the target stationary location has a weighted value responsive to factors selected from the group consisting of proximate vehicular traffic, line of sight, proximate pedestrian traffic, height, proximity to cultural events, proximity to cultural facilities, the type of media being projected, the time of day, the day of the week, the date, the length of time the media is projected, and combinations thereof.

3. The system of claim 1 wherein the media projection subsystem projects media selected from the group consisting of a displayed image, broadcast sound, or a combination thereof.

4. The system of claim 1 wherein the communications subsystem receives media uploads from a server; and,
wherein the communications subsystem provides the media uploads to the media projection subsystem for projection.

5. The system of claim 1 further comprising:
a camera having an output to supply images of the geographic location proximate to the media projection subsystem.

6. The system of claim 1 wherein the targeting application provides a reward to an entity in response to a value of the selected target stationary location.

7. The system of claim 1 further comprising:
a publically accessible access point (AP), configured for attachment to the media projection subsystem, selected from the group consisting of an IEEE 802.11 Wireless Local Area Network (WLAN) AP, an IEEE 802.15 Wireless Personal Area Network (WPAN) AP, and both WLAN and WPAN AP.

8. The system of claim 7 further comprising:
a communication gauge having an output to supply a measurement of communication subsystem communication statistics; and,
a handicap subsystem having an interface to offset a communication value associated with the access point in response to the communication statistics.

9. The system of claim 1 further comprising:
a server having an interface to accept the verification information from the communication subsystem; and,
a server memory to store the verification information.

10. The system of claim 9 wherein the server is associated with a second entity;
wherein a first entity is associated with the media projection subsystem; and,
wherein an entity selected from the group consisting of the first and second entities selectively enables the media projection subsystem.

11. The system of claim 1 wherein the media projection subsystem is selected from a group consisting of an image projector, a topper, a retractable screen, a liquid crystal display, holographic display, a light emitting diode display, wallscape, electroluminescent (EL) display, switchable glass displays, persistent image fan, and combinations thereof.

12. The system of claim 1 further comprising:
a monitoring subsystem having an interface to measure public exposure to projected media and an output to supply exposure measurements; and,
a handicap subsystem having an output offsetting a media value associated with the enablement of the media projection subsystem, calculated in response to the exposure measurements.

13. The system of claim 12 wherein the monitoring subsystem comprises:
a camera; and,
a facial direction detection subsystem accepting images from a camera, selecting faces from camera images, and measuring a duration of time the faces are directed towards the media projection subsystem.

14. The system of claim 1 further comprising:
a plurality of portable media projection subsystems; and,
wherein the combination of media projection subsystems supplies a coordinated media integrated display, with a first portion of the coordinated media being linked to a second portion of the coordinated media.

15. The system of claim 1 further comprising:
a media projection subsystem mounted on a mobile platform selected from the group consisting of ground-based, water-based, or airborne mobile platforms; and,
wherein the combination of the portable media projection subsystem and a mobile platform media projection subsystem supplies a coordinated media integrated display, with a first portion of the coordinated media being linked to a second portion of the coordinated media.

16. A portable access point system comprising:
a publically accessible access point (AP) selected from the group consisting of an IEEE 802.11 Wireless Local Area Network (WLAN) AP, an IEEE 802.15 Wireless Personal Area Network (WPAN) AP, or both WLAN and WPAN AP, and having an interface to supply an enablement signal in response to the AP being enabled;
a location device to supply a geographic location of the AP;
a verifier having an interface to receive the enablement signal and the geographic location, and an interface to supply verification information including the enablement signal and the geographic location, in response to the AP being enabled in a stationary location for a predetermined minimum duration of time;
a communications subsystem having an interface to receive verification information and an interface to communicate the verification information; and,
a targeting subsystem permitting an entity to select a target stationary location from a plurality of value weighted target stationary locations.

* * * * *